United States Patent [19]

Sznopek et al.

[11] 4,329,193
[45] May 11, 1982

[54] METHOD OF MAKING A COUPLING FOR RIGID PRESSURE PIPE

[75] Inventors: John L. Sznopek; Charles Lostak; Robert W. Heisler; Joseph P. Ferraro; Henry J. Kazienko, all of Littleton, Colo.

[73] Assignee: Manville Service Corporation, Denver, Colo.

[21] Appl. No.: 135,566

[22] Filed: Mar. 31, 1980

Related U.S. Application Data

[62] Division of Ser. No. 918,226, Jun. 23, 1978.

[51] Int. Cl.³ .................. B65H 81/00; F16L 21/02
[52] U.S. Cl. .................................... 156/162; 156/165; 156/172; 156/229; 285/423
[58] Field of Search .............. 156/172, 173, 175, 165, 156/161, 162, 229; 285/423, DIG. 20, 110, 391, 282, 236, 55, DIG. 10; 271/DIG. 6, 364

[56] References Cited

U.S. PATENT DOCUMENTS

| | | | |
|---|---|---|---|
| 2,896,976 | 7/1959 | Wiltse | 285/230 |
| 3,407,101 | 10/1968 | Lockshaw | 156/175 |
| 3,462,175 | 8/1969 | Johnson | 285/423 |
| 3,743,329 | 7/1973 | Wesel | 285/236 |
| 4,003,541 | 1/1977 | Schuldink | 285/423 |
| 4,174,125 | 11/1979 | Wyss | 285/423 |

FOREIGN PATENT DOCUMENTS

| | | | |
|---|---|---|---|
| 2744739 | 4/1978 | Fed. Rep. of Germany | 285/423 |
| 671120 | 3/1927 | France | 285/110 |

*Primary Examiner*—Michael W. Ball
*Attorney, Agent, or Firm*—Robert M. Krone; Joseph J. Kelly; Gregory W. O'Connor

[57] ABSTRACT

A coupling comprises a body of fiber glass reinforced plastic which has a rubber sleeve embedded therein. The rubber sleeve is a one piece unit which includes specially shaped sealing gaskets on either end and has a rubber liner spanning the area between these sealing gaskets. This rubber sleeve is stretched onto a steel and plastic molding mandrel. This stretching places the rubber liner under tension which reduces the cross-sectional area of the liner and compensates for thermal expansion of the liner during curing. The mandrel/sleeve combination is rotated in order to wind a thermosetting resin impregnated fiber glass roving around the outer circumference of the mandrel/sleeve combination, thus embedding the sleeve in the fiber glass reinforced resin matrix. The thermosetting resin is cured at elevated temperatures, hardening into a rigid coupling with the embedded rubber sleeve integral therewith. Thereafter the hardened coupling is stripped from the steel and plastic mandrel and subjected to a further curing and finishing operation.

8 Claims, 4 Drawing Figures

U.S. Patent    May 11, 1982    Sheet 1 of 3    4,329,193
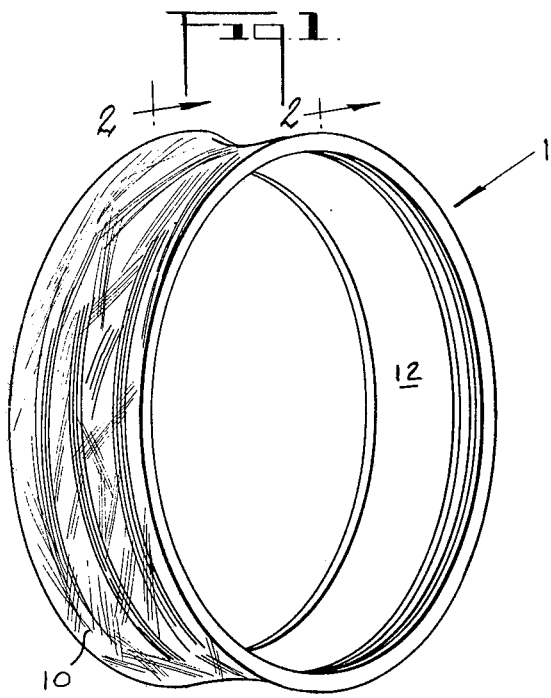
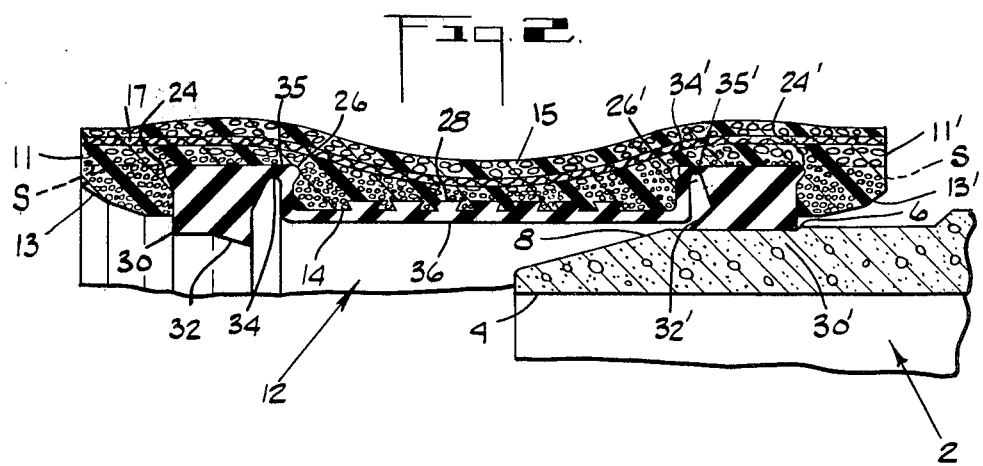

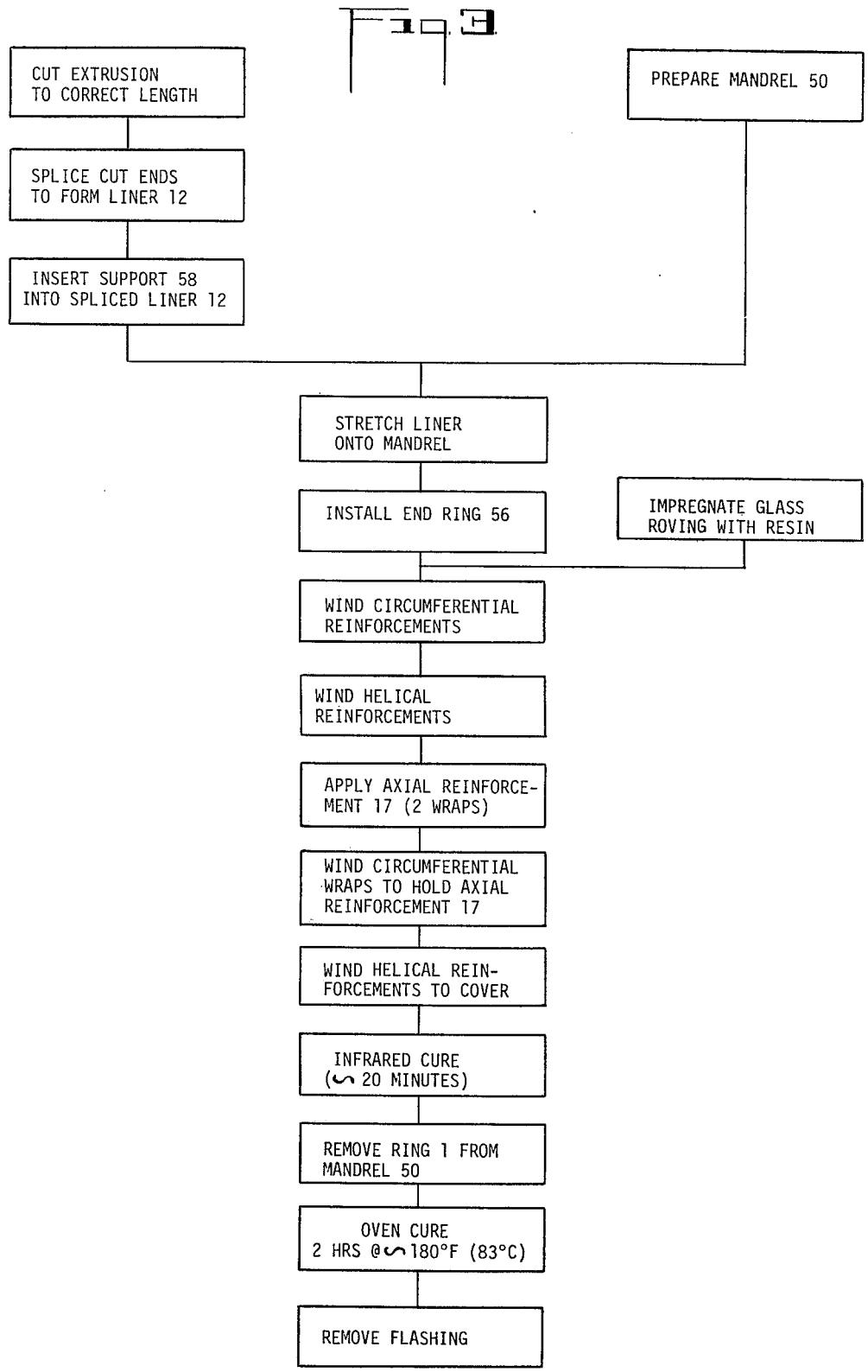

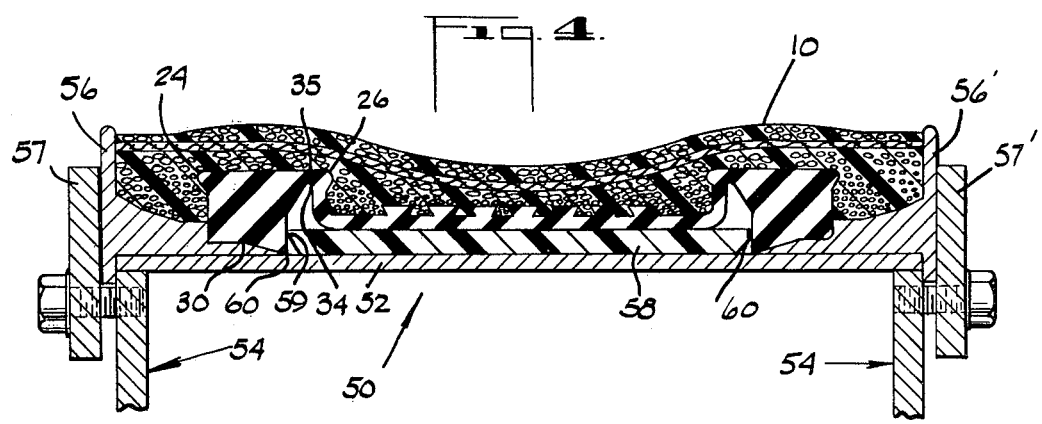

METHOD OF MAKING A COUPLING FOR RIGID PRESSURE PIPE

This is a division of application Ser. No. 918,226, filed June 23, 1978.

BACKGROUND OF THE INVENTION

This invention relates to a novel coupling made of a composite of fiber glass reinforced plastic and an integral rubber sleeve for use in interconnecting sections of essentially rigid asbestos-cement pipe for forming a conduit system for carrying fluids under pressure. In the past such systems have in general included lengths of asbestos-cement pipe with precisely turned or machined ends. These ends were interconnected by a coupling made from a relatively large thick walled section of asbestos-cement pipe. This coupling was made by cutting a length of pipe of proper dimensions into a series of relatively short cylinders, and subsequently machining a sealing ring groove into both ends of the interior diameter of each short cylinder of asbestos-cement pipe. While such a coupling system incorporated all the structural, chemical and availability advantages inherent in the use of the asbestos-cement material, forming, in general, an entirely acceptable pressure conduit system, the great number of machining steps needed to form the coupling itself from an asbestos-cement pipe resulted in many drawbacks. Efforts to reduce or eliminate airborne particles of asbestos which result from the various cutting and machining operations necessary to form the coupling have led to concomitant increase in the cost and complexity of these operations. These various machining operations are accomplished under a flood or spray of water to hold the minute particles of asbestos-cement and prevent their loss to the atmosphere. However, increased restrictions on the discharge of this asbestos bearing water effluent makes this solution less economically viable.

The coupling itself tended to be large and massive. Manipulating this massive coupling in the field often resulted in improperly connected pipe Also, the coupling required that the trench be enlarged in the area of the coupling in order to accommodate its greater diameter. Also, the sealing rings, which were positioned in the machined grooves at either end of the coupling, were in constant danger of being displaced during the connection of the spigot ends of the pipes into the coupling.

Attempts in the past to use so-called advanced materials as a substitute for this asbestos-cement coupling have largely met with varying degrees of failure. Each such attempt has incorporated one or a number of the above enumerated disadvantages inherent in the asbestos-cement coupling, or have incorporated into the system certain disadvantages inherent with the substitute material itself. One such inherent disadvantage has been the result of the wide discrepancy between the modulus of elasticity of the asbestos-cement pipe lengths intended to be sealingly connected by the coupling and the lower modulus of elasticity of the material used in the coupling itself. This differential in rigidity between the pipe and the coupling can cause the overall system to fail and leak, especially when there is less than optimum placement of the pipe in the trench. For example, two pipe lengths which are intended to be connected by a somewhat less rigid ring may shift relative to one another when the fill under one such length of pipe is less compacted than the fill under the other length of pipe. Under this condition the weight of one length of pipe is borne by the relatively elastic coupling. The coupling reacts to this stress by deflecting and resulting in a leak between the sealing gasket and one or the other of the pipe lengths. While such deflection and concomitant leaking is less critical and indeed less likely to happen in a nonpressurized conduit system, this deflection and concomitant leaking can have disasterous results in a pressurized system.

Another known coupling was constructed of a fiber glass reinforced epoxy body having a pair of separate gasket seals positioned at each end of the inner diameter. These gaskets were embedded in the fiber glass/epoxy matrix, but required a separate layer of urethane rubber which was sprayed onto the mold mandrel and the individual gaskets to form a liner between the gaskets and to form the bond between the gaskets and the matrix. Also, the cost of epoxy resin and the curable urethane rubber made the coupling too expensive.

U.S. Pat. No. 3,462,175 shows a filament wound coupling which is formed on a cylindrical mandrel with removable rubber inserts which form tapering spiral contours on the inner diameter of the fiber glass/matrix body. But this system requires assembly in the field and the rotary engagement with the pipe ends would be impractical for large diameter pressure pipe.

Another publication of interest is Japanese Pat. No. 61,683 patented Nov. 10, 1924, which shows a connecting coupling having sealing gaskets and an integral connecting liner held in sealing engagement to the ends of pipe sections by steel rings.

Hence, it would be highly advantageous to construct a coupling which would utilize the benefits of the so-called advanced composite materials, such as fiber glass reinforced plastic, permitting the construction of a relatively light, strong coupling, and yet would result in a pressurized conduit system which would tolerate the stresses normal to subterranean installations. Such a system would be desirably a one-piece system to permit easy installation of the coupling arrangement, be inexpensive to manufacture, withstand the rigors of carrying fluid under elevated pressure and be relatively cheap to manufacture.

SUMMARY OF THE INVENTION

It is an object of the present invention to provide a coupling for interengaging lengths of rigid pipe to form a pressurized fluid conduit wherein the coupling ring is composed of an integral construction of fiber glass reinforced plastic and a fluid tight rubber sleeve having integral therewith sealing gaskets firmly embedded in said fiber glass reinforced plastic for engagement with said rigid pipe.

It is another object of the invention to provide a system for manufacturing such a coupling in an economic and dependable manner.

It is another object of the present invention to provide a mold mandrel which is easily and inexpensively constructed, and which permits precise control of the dimensions of the coupling constructed thereon, especially those dimensions critical to the sealing function of said coupling.

The instant invention provides such a coupling by forming a rubber sleeve from a continuous length of polyester resin compatible rubber such as EPDM (peroxide cured ethylenepropylene-diene terpolymers) rubber. Critical dimensions of the pipe engaging sealing portions and fiber glass reinforced body engaging surfaces of the rubber sleeve are controlled by placing the sleeve under a predetermined tensile stress during the formation of the fiber glass reinforced polyester body portion of the coupling. Such a pre-stress condition is obtained by forming the liner in a predetermined circumference such that the sleeve is stretched around a generally cylindrical mandrel prior to the formation of a plurality of layers of thermoplastic impregnated fiber glass roving about its outer circumference. Preferably the central portion of the rubber sleeve which interconnects the sealing gasket portions along each lateral edge is supported during the fiber glass lay-up and curing operation by a removable generally cylindrical polymeric support, such as polyethylene, in order to stretch this portion of the sleeve the required amount and to hold this portion of the sleeve in approximately its final configuration. The rubber sleeve, held in this prestressed condition can be safely subjected to the relatively elevated temperatures of the curing cycle inherent in the exothermic reaction characteristic of the thermosetting plastic curing operation as well as the oven treating operation necessary to obtain a uniformly cured condition. Upon cooling the sleeve has relaxed due to creep at the curing temperature, thus relieving the longitudinal stress provided by the mandrel and central polyethylene support. The rubber sleeve assumes approximately the proper undeflected state relative to the now rigid fiber glass reinforced plastic matrix. In such a state the mechanical and/or chemical bond between the rubber liner and the fiber glass reinforced plastic matrix remains in an optimum condition assuring the maintenance of proper dimensional tolerances during installation and service life of the coupling.

BRIEF DESCRIPTION OF THE DRAWINGS

FIG. 1 shows a perspective view of the completed coupling according to the instant invention.

FIG. 2 is a sectional view of the coupling along line 2—2 of FIG. 1 in operative engagement with a pipe section.

FIG. 3 illustrates the overall process for forming the coupling ring.

FIG. 4 is a partial sectional view of the completed coupling on a forming mandrel.

DETAILED DESCRIPTION OF THE PREFERRED EMBODIMENT

As can be seen from FIG. 1 the coupling of the instant invention in the form of a generally annular body which consists essentially of two main parts. An outer fiber glass reinforced plastic body portion 10 and a rubber sleeve 12 which constitutes a major portion of the interior surface of the coupling 1.

FIG. 2 shows a cross-sectional view of a coupling with an end 4 of pipe section 2 thrust into one end of the coupling to show the interengagement of the coupling with the pipe section. The rubber sleeve 12 consists of three main sections, gasket portions 30 and 30' at either peripheral end and a liner portion 36 spanning the annular area between gasket portions 30 and 30'. Each gasket portion 30, 30' includes a lip portion 32 or 32' respectively which bears against corresponding annular portion 8 of pipe section 2 and which is adapted to be forced inwardly by pressure within the coupling into firm engagement with annular portion 8. Between finned portions 32 or 32' and liner 36 is an annular groove 34 or 34'. As can be seen in the right hand portion of FIG. 2 the function of 34 and 34' becomes most apparent. When end portion 4 of pipe section 2 is thrust into engagement with the coupling the relative diameter of annular portion 8 is such that gasket 30 and finned portion 32' are forced radially outward and are deformed between the corresponding portion of plastic body 10 and annular portion 8. The displacement of the elastomeric material making up gasket portion 30' is in an axial direction since radial expansion is prevented by body 10. Annular groove 34' provides space for this axial flow. Without such a space the amount of force required to install end portion 4 into the coupling would be considerable, resulting in unacceptable radial stress on the coupling 1 and making the insertion of end 4 into the coupling virtually impossible.

Axially inward from gasket portions 30 and 30' is rubber liner portion 36. As illustrated in FIG. 2, this portion includes annular circumferentially extending interlocking ribs 28. These ribs are of a known type and are used to mechanically interlock liner portion 36 with the central portion 15 of fiber glass reinforced body 10. Ribs 28, while not necessary to the basic functioning of the connecting ring, supplement any adhesive bonding of the rubber liner 36 to the thermosetting plastic constituent of body 10.

Gasket portions 30 and 30' include axially extending circumferential protrusions or ribs 24, 24' and 26 and 26'. These ribs function in a similar manner to interlocking ribs 28 of liner portion 36 but are more vital to the proper operation of the instant invention. Ribs 24, 26, etc., in conjunction with the radially outwardly facing portion of gasket 30 define an enlarged ring of elastomeric material which becomes embedded in the thermosetting plastic matrix of body 10. This embedding action prevents displacement of ring 30 which might otherwise result from the axial thrust on radially inward portion of 30 and lip 32 resulting from the installation of the end portion 4 of pipe section 2 as well as the axial thrust resulting from shoulder portion 6 of pipe section 2 bearing against gasket portion 30.

This embedding action can be seen when one considers for example the operation of shoulder portion 6 as shown on the right hand portion of FIG. 2. An axial thrust to the left of FIG. 2 would bring shoulder portion 6 firmly against gasket portion 30'. While gasket portion 30' remains under radial outward compressive stress provided by the fit of annular portion 8 on pipe 2, this axial thrust by shoulder portion 6 would begin to drag the contacting edge of gasket portion 30 in the axial direction which would stretch the bulk of the rubber material, relieving this outward compressive stress and in fact placing that part of 30 near 24' in tension. This tensile force, if unopposed, would unseat 30 from its embedded condition in body 10. Such unseating would be undesirable in that it would permit end portion 4 to move into contact with the corresponding end portion of an adjoining pipe section.

But, more importantly, such unseating may occur by inserting end 4 into the coupling at an angle such that the leading annular edge of 4 impacts on the shoulder engaging edge of gasket portion 30'. If such unseating took place in the field, resulting in a "fish mouthed" gasket, the coupling would be damaged and not seal correctly.

However, both of these modes of failure are substantially eliminated by incorporating annular protrusions 24 and 24' since they, in combination with narrow portions 35 and 35', the adjacent part of gasket portion 30 and 31 as well as opposite annular protrusions 26 and 26', provide a mass of rubber which is substantially surrounded by fiber reinforced plastic body 10.

A similar case can be made for annular enlargements 26 and 26' except that, in addition to cooperating with 24 and 24' as outlined above, they operate in a similar manner to resist unseating forces which affect gasket portions 30 and 30' from the opposite axial direction (i.e. to the right in FIG. 2 for gasket portion 30'). These unseating forces are unlikely to occur during the coupling operation as outlined above, but are more likely to occur during the service life of the pipe/coupling system when for example adjacent pipe lengths shift relative to one another.

Surrounding the elastomeric sleeve 12 is fiber glass reinforced plastic body 10. Extending axially on either end of 12 are portions 11 and 11' of body 10. These portions define frusto-conical guiding surfaces 13 and 13' which operate to guide end portion 4 of pipe section 2 into proper engagement with gasket portions 30 and 30' as well as protect the gasket portions 30 and 30' from mechanical displacement and abrasion during shipping, storage and installation. Central portion 15 of body 10 supports sleeve portion 36 and has sufficient mechanical strength to withstand the mechanical and hydrostatic loads associated with the functioning of the coupling 1. In general, the overall structure of body 10 consists of circumferential and helical wraps of fiber glass roving impregnated with a thermosetting plastic, preferably a known polyester/hardener system. In addition to these circumferential and helical fiber glass reinforcing layers, body 10 includes axial fiber glass reinforcing 17 which is embedded substantially in the middle of the volume of reinforced plastic making up body 10. In the preferred embodiment, this axial reinforcing consists of about two layers of fiber glass "scrim"; a fabric made of discrete bundles of fiber glass filaments oriented parallel to the axis of the coupling, these bundles being held parallel with one another but spaced a uniform distance by highly spaced strands of polyester thread. This product is made for commercial sale by the Erskin-Johns Corporation.

The method of making the coupling illustrated in FIGS. 1 and 2 can best be seen with reference to the schematic diagram of FIG. 3. In this preferred method the elastomeric sleeve 12 is cut from a continuous extrusion of peroxide cured EPDM rubber. The choice of this particular compound will be more fully explained later. The cut section of the extrusion is spliced to form the desired annular configuration. It is necessary that the completed annular sleeve 12 have sufficient mechanical integrity at the splice so as to not break or split under coupling/pipe assembly and operational stresses. It has been found that this particular rubber extrusion can be spliced by coating the ends with a rubber cement supplied by the manufacturer and vulcanizing this joint in a heated vulcanizing mold which conforms substantially to the contour of the sleeve 12. Such vulcanizing mold must be able to maintain the splice under pressure so as to hold the cemented abutting ends in intimate contact during heating. Also, the mold should impart a smooth surface to the sleeve at the gasket portions to prevent a possible source of leakage when engaged with a pipe end. The particular final size of the sleeve 12, especially its circumferential dimension, is quite critical to the correct operation of the overall coupling. Obviously this circumferential dimension is determined at the time of cutting the extrusion and splicing. It has been found that during curing of the polyester body after it has been formed onto the rubber liner, the exothermic reaction generates temperatures as high as 340° F. to 360° F. at the interface 14 between the liner 12 and body 10. This elevated temperature causes the sleeve 12 to expand volumetrically, causing a lengthening along its circumferential dimension as well as an increase in its cross-sectional area. This expansion in cross-sectional area is most critical since such expansion would cause an increase in the effective diameter of the fiber glass/polyester body in the area supporting sealing gaskets 30 and 30'. It must be remembered that due to the relatively flexible nature of the coupling during its operation in sealing to a pair of rigid pipe sections, any deviation from the optimum diameter in this area can cause leaks between these gaskets and the corresponding sealing surfaces of the pipe sections.

Hence, in an effort to correct for this inherent volumetric expansion of sleeve 12 the splice as outlined above is made so as to define a sleeve having a circumferential dimension which is approximately 2% to 3% less than the circumferential dimension of the sleeve in its final embedded condition in the finished coupling 1. The spliced liner is then installed on a rotatable mold mandrel in such a manner so as to be stretched to its actual final circumference. This stretching operation causes the cross-sectional area of the sleeve 12 to be reduced to such an extent that the thermal expansion during the exothermic curing operation does not cause the cross-sectional area at the resulting elevated temperature to displace the curing resin body and cause dimensional discrepencies in the completed coupling. Put another way, presuming that the initial circumferential dimension of the sleeve 12 is 2% less than its final configuration, when placed on the properly sized rotatable mold mandrel it will be stretched along its circumferential dimension by approximately that 2%. The volume of the mass of rubber making up sleeve 12 remains essentially constant since the volume compressability of rubber is almost zero. Accordingly, its cross-sectional area must be reduced by an amount determined by the Poisson's ratio of rubber, which, for extensions of this magnitude, equals about 0.5. This results in an average reduction of the cross-sectional area of about 1% from the unstretched condition. The coefficient of thermal expansion for rubber is between $8 \times 10^{-5}/°F$. and $12.5 \times 10^{-5}/°F$. While the exact mechanism is not fully known, it is likely that the linear expansion of between 2% and 3.5% (based on the above coefficient range) experienced by the sleeve 12 during the exothermic heating is substantially compensated for by this 1% initial reduction in cross-sectional area resulting from the initial stretching step. In any event the dimensional aspects vital to the sealing operation are properly controlled.

The exact degree of circumferential stretching for all coupling diameters is not necessarily 2%. This figure seems to at least apply to couplings used for 24 inch nominal diameter pressure pipe. The following criterion however would hold for virtually any size coupling made according to the disclosed method.

The upper limit on the amount of circumferential stretch is defined primarily by the difficulty in mounting the sleeve, together with the support 38, onto the mandrel 50. For example, splicing the sleeve in order to require stretching the sleeve by 10% would make the manual mounting of the sleeve on the mandrel virtually impossible while benefiting the dimensional control aspects little, if at all, over a nominal 2% stretch. Conversely, a 1% stretch may make the mounting operation quite easy, but would be inadequate to control the final gasket dimensions.

It could be argued that this pre-stretching could be eliminated by merely allowing for this thermal expansion and subsequent distortion of body 10 when constructing the mandrel 50 that is, if it were found that the thermal expansion of an unstretched sleeve results in an increased diameter at gasket portion 30 of 0.050" for example, one need only make the mandrel 50 0.050" smaller in diameter to compensate. However, this method of correction does not give the reproducible results required. Unlike the pre-stretch method, this method does not dependably and firmly seat the sleeve on the mandrel, prevent shifting of the sleeve during the fiber glass filament winding operation, nor does it take advantage of the effects of thermal creep as the pre-stretch method does as outlined above.

With the elastomeric liner 12 properly installed on the cylindrical mold mandrel the process of building up the polyester body 10 is begun. The mandrel with liner 12 is rotated while a length of fiber glass roving impregnated with a polyester-hardener system is caused to wind onto the outer circumference of the mandrel/liner arrangement. The preferred system for accomplishing this impregnation operation is disclosed in U.S. Pat. No. 4,068,619 issued to Robert Lee Batts on Jan. 17, 1978 and assigned to the Assignee of the present application. The particular polyester material is of a known type and obtainable from Freeman Chemical Company. This material is combined with approximately 2% of cumene hydro peroxide (C.H.P.) hardening agent as it is added to the reservoir in the glass fiber impregnating apparatus disclosed in the above-referenced patent.

The particular fiber glass reinforcing material is subject only to general considerations of supply, ultimate structural strength of the body 10 and compatibility with the polyester matrix material. In the preferred method, 23 to 27 strands of fiber glass roving material are dispensed from a creel arrangement of known design and passed through the impregnating apparatus. The fiber glass material which has been found to be acceptable is an item of commerce obtainable from Owens-Corning Corporation, and is known as Type 30 and is preferably dispensed from a coreless package of continuous roving designated as "TRANSPACK". The fiber glass roving strands are treated with a silicate type sizing which is compatible with the polyester matrix material and permits quick and thorough saturation of the filaments making up the roving.

The particular sequence involved in applying the fiber glass reinforcement material is as follows. Generally the first layer of fiber glass roving is comprised of a series of circumferential windings spanning the entire axial length of body 10. It is preferred that a plurality of circumferential turns be applied radially inward from and in close abutting relation to each annular projection 24, 26, 24' and 26'. At least one circumferential turn of roving should be applied between each circumferentially extending interlocking flange 28. This circumferential reinforcement places the fiber glass in close proximity to those portions of rubber liner 12 which require mechanical strength in order to prevent the liner 12 from being displaced from its embedded relation with body 10.

Upon completion of the circumferential wraps as outlined above, a series of helical wraps are applied. These helical wraps are continued until the entire outer surface of the rotating mandrel is covered. At this point the axial glass reinforcement 17 is applied. This reinforcement consists of two circumferential wraps of the above designated type of scrim. This scrim need not be preimpregnated with the polyester/hardener material since an adequate amount of this matrix material is carried to the rotating mandrel on the glass roving. It has been found necessary only to hold down the scrim 17 with a circumferential wrap of the impregnated roving in the middle and at both axial ends of the coupling. The position of the axial ends of scrim 17 should be such that the area proximate to and axially out from protrusions 24 and 24' (shown in FIG. 2 as shear plane S) is avoided. It has been found that placement near shear plane S may cause a delamination in this area when the coupling/pipe system is subjected to elevated hydrostatic pressures.

Finally, a second series of helical wraps are applied over the axial reinforcement 17 and completely cover the outer circumference of the rotating mandrel.

At this point the mandrel is removed from the winding apparatus and transferred to an infrared curing oven. The mandrel continues to rotate during this initial infrared curing since the polyester matrix is quite fluid and would tend to drip or form some asymmetrical shape if the mandrel were allowed to remain static in either the vertical or horizontal position. This infrared cure step progresses for approximately 20 minutes, or until the polyester matrix has adequate physical integrity to permit the removal of the mandrel. It is also during this time that the sleeve 12 experiences most of the thermal expansion and relaxation or thermal creep. Hence, the critical dimensional aspects are substantially stabalized before the mandrel is removed, and remains relatively unaffected by subsequent processing steps. It should be remembered that, despite the circumferential stretching during mounting on the mandrel, the sleeve has little if any tendency to return to its original size, but due to the accelerated creep during the exothermal reaction, has rather assumed the desired final diametrical size.

The mandrel is now removed and prepared for the next winding operation while the completed and partially cured coupling is transferred to a hot air oven for its final curing step. This final curing operation lasts about one hour and in the preferred embodiment the temperature in the oven is at about 175° F. The coupling at this point is substantially completed, requiring only that the sharp edges or flashing which may exist on the extreme axial ends of the coupling ring be removed by sanding or otherwise.

FIG. 4 shows the detail of the rotatable mold mandrel used in forming the coupling. The mandrel 50 has a main body portion 52 which is essentially a smooth cylindrical steel body which includes end portions 54 extending from the cylindrical portion 52 to a hub (not shown) for connection to the various apparatus for rotating the mandrel during wrapping, curing, etc. Cylindrical portion 52 preferably has a very slight taper (perhaps 0.005 inch difference from one end to the other for a nominal 24 inch diameter coupling) in order to permit easy removal of the finished coupling. On either end of cylindrical portion 52 are end rings 56 and 56' which are held in position by rotatable bars 57 and 57'. End rings 56 and 56' define the extreme axial ends of body 10 and form the molding surfaces for those surfaces as well as the frusto-conical guide portion 13 as outlined supra. Also, the extreme inward portion of these end rings support and stretch the gasket portions 30 of elastomeric liner 12. Positioned between cylindrical portion 52 and sleeve portion 14 of sleeve 12 is mold insert 58 which supports liner portion 36 in its circumferentially stretched condition as outlined supra. Insert 58 is preferably a generally rectangular piece of relatively stiff, dense polymeric material, such as linear polyethylene, having a length substantially equal to the stretched circumferential length of the sleeve 12. Along each circumferential edge of insert 58 are gasket abutting edges 59, and undercut edges 60. The insert 58 is preferably positioned in the spliced sleeve 12 and then the insert/sleeve combination is forced onto the cylindrical portion 52 of the mandrel by hand. Subsequently one or the other of the end rings 56 or 56' is positioned over its corresponding end of cylindrical portion 52 and fastened with toggles 57 or 57'.

The preferred construction of the mandrel 50 has many benefits inherent therein. First, the overall construction is merely one of a rigid single piece cylinder not requiring complex interconnecting mold halves, precisely turned surfaces of complex nature, etc., which are normally necessary in order to permit releasing of the hardened polyester body 10 therefrom. Also, since most of the internal surface of the coupling ring is defined by the elastomeric lining 12, only end rings 56 and 56' require any precisely contoured surfaces. The use of the polyester insert 58 eliminates the need of constructing cylindrical surface 52 with any raised portion to support the liner portion 36 of the sleeve 12. This permits insert 58 to slide axially with the completed and cured coupling 1 when it is removed after end ring 56 has been removed. Insert 58 can of course be peeled from the inside of the cured coupling ring for subsequent insertion in the next sleeve 12. During the mounting of the sleeve 12/insert 58 combination onto mandrel 50, abutting edges 59 assure that the gasket portions 30, 30' and lip portions 32 and 32' are correctly positioned on the corresponding part of end rings 56 and 56'. However perhaps more importantly, edges 59 in conjunction with undercut portions 60 further aid in preventing gasket portions 30 and 30' from thermally expanding in a manner so as to distort the body 10 during curing. During this stage of the manufacturing operation as stated supra, sleeve 12, and more specifically gasket portions 30 and 30', have a tendency to not only expand against the curing resin matrix radially outward therefrom, but also to expand in the axial direction of mandrel 50. Annular cavity 34 provides relief for some of this axial expansion by providing an empty space into which parts of the thermally expanding rubber can move. While this relief provided by cavity 34, in combination with the circumferential pre-stressing set forth supra, corrects for most of the deleterious effects of this thermal expansion, it was found to generate a distortion in the final position of the gasket portion 30. This distortion seemed to be the result of lip 32 being held immovable in the slot-like juncture between the immediately adjacent supporting portion of end ring 56 and the abutting edge of support 58. Any expansion along a line between projection 24 and lip 32 translated the bulk of gasket portion 30 in the direction of 24, destroying the precise positioning needed to achieve the sealing function in service.

However, the provision of undercut 60 permits lip 32 to expand axially rather than to thrust gasket 30 in the direction of projection 24, acting as a safety valve for this thermal expansion. Thus, abutting edges 59 contrive to initially position and to hold the bulk of gasket portions 30 and 30' on end rings 56 and 56'. Undercut portions 60 are such that they do not detract from this vital operation of support 58, but are remarkably effective in balancing the thermal distortion as outlined supra. These undercut portions are shown slightly exaggerated in the drawings. Preferably, however, they form an angle of about 20° to abutting edges 59. It has been found that without this edge feature on insert 58, the distortion of critical diameter at gasket portions 30 and 30' resulted in a 60% dimensional rejection rate. However, upon application of inserts 58 having edge features 59 and 60, the rest of that production run was within tolerances.

As stated previously, sleeve 12 is preferably formed from a peroxide cured ethylene-propylene-diene terpolymer type rubber which is frequently referred to by the ASTM designation "EPDM". It has been found in the past that under certain conditions, for example when a polyester resin which uses a peroxide curing agent is cured in contact with a rubber compound having a highly reactive surface, for example a sulfur cured rubber compound, that the polyester resin will not fully cure in the presence of such rubber and the resin remains tacky in the area of the rubber/resin interface. The insufficient curing thus leaves the resin article badly weakened in the area of the interface and also prevents the rubber body from being properly retained and/or adhered to the resin body. In a pipe coupling such as disclosed in the instant application, such insufficient curing of the resin creates a weakened area in the pipe coupling wall and also prevents the rubber gasket from being satisfactorily retained within the structure, particularly when forces are exerted against the rubber gasket during joining of adjacent lengths of pipe in the field using such couplings. In addition, the uncured resin itself acts as a lubricant and allows the rubber gasket to be pulled easily out of the coupling.

The polyester resin of the matrix portion of body 10 may be any polyester resin in which curing of the resin is initiated by a peroxide. Descriptions of typical polyester resins, the curing reactions, and the use of peroxide curing agents ("initiators") are widely found in the literature; a typical description is found in Noller, *Chemistry of Organic Compounds* (3d edn., 1965) at page 885.

The surface affinity of the peroxide cured EPDM rubbers for the peroxide curing agents of the polyester resin is inherently sufficiently low that with conventional amounts of curing agent in the uncured resin a complete cure can be accomplished using conventional reaction parameters. It should be noted, however, that the sleeve 12 is formed from a commercial peroxide cured EPDM rubber body made by extrusion and that during the extrusion process it will be coated with extrusion aids, mold release agents and similar materials. Consequently the surface of the sleeve 12 should be cleaned of these foreign materials before being brought into contact with the uncured resin, since the foreign materials themselves may well have a high degree of affinity for the peroxide curing agent and thus detrimentally affect the polyester cure.

While the preferred embodiment is directed to use on asbestos-cement pressure pipe, the invention can be used in conjunction with other pipe in other environments.

What is claimed is:

1. In a method of forming a coupling for pipe including:
   (a) forming a rubber sleeve having gasket means for sealingly engaging the ends of adjacent lengths of pipe;
   (b) supporting said sleeve on a mold mandrel;
   (c) forming a fiber reinforced resin body around and in intimate contact with said sleeve; and
   (d) curing said body around and in intimate contact with said sleeve at elevated temperatures to form a coupling capable of supporting said liner during sealing engagement with said pipe, the improvement comprising:
   supporting said sleeve on said mandrel by stretching said sleeve by a predetermined degree in order to place said sleeve under a circumferential stress so as to reduce the cross-sectional area of said sleeve to substantially compensate for the displacement of the then curing resin body caused by the thermal expansion of said sleeve during said curing step whereby dimensional discrepancies are substantially prevented.

2. A method as set forth in claim 1 wherein step (a) further includes providing a predetermined length of extrusion having a cross-sectional shape defining said gasket means along each longitudinal edge joined by an integral liner portion and bonding the ends of said extrusion to form said sleeve.

3. The method as set forth in claim 2 wherein said extrusion is of a peroxide cured EPDM rubber and said resin body comprises glass fibers in a polyester matrix.

4. The method as set forth in claim 2 and further comprising providing said cross-sectional shape of said extrusion with a gasket portion along each edge and joining each said gasket portion to said liner portion by an integral member having the shape of a radially inwardly open groove.

5. The method as set forth in claim 4 further including: providing a mandrel having a substantially right circular cylindrical surface thereon, attaching to one end of said surface an end ring having an outwardly facing surface substantially defining a molding surface for said fiber reinforced resin body, installing a flexible support into the inner circumference of said sleeve such that said support is positioned between said gasket portions and is substantially parallel to and supports said liner, and stretching said sleeve with said polymeric support installed therein onto said cylindrical surface of said mandrel so as to bring one of said gasket portions into substantially continuous circumferential contact with said end ring, and installing a second end ring on the other end of said cylindrical surface so that the other of said gasket portions is brought into substantial circumferential contact with said second end ring.

6. The method as set forth in claim 4 further including: providing in said sleeve a generally right circular cylindrical support means positioned between and abutting against both said gasket portions having undercut portions extending around its circumferential edges; stretching said sleeve with said support means positioned therein onto said mold mandrel in such a manner that said support means substantially fills the area between said liner and said mandrel; after forming said fiber reinforced resin body around said sleeve on said mandrel, permitting said sleeve to reach a temperature of about 340° F. to 360° F.; permitting said gasket portions to thermally expand such that at least part of said gasket portions expand in an axial direction into said cut-out portions of said support means.

7. The method as set forth in claim 2 and further comprising providing said cross-sectional shape of said extrusion provided therein includes on said gasket means generally axially extending circumferential protrusions, and winding resin impregnated fiber glass reinforcing filaments circumferentially around said sleeve such that at least one circumferential wrap of said filaments is positioned radially inward of said protrusions and in intimate contact with said gasket means.

8. The method as set forth in claim 1 wherein step (b) further includes stretching said sleeve onto and around said mandrel so as to increase the average diameter of said sleeve by about 2%.

* * * * *